United States Patent
Reams et al.

(10) Patent No.: US 9,338,495 B2
(45) Date of Patent: May 10, 2016

(54) SYSTEM AND METHOD FOR REMOTE DEVICE PAIRING

(71) Applicant: EchoStar Technologies L.L.C., Englewood, CO (US)

(72) Inventors: William R. Reams, Englewood, CO (US); Christopher W. Bruhn, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 75 days.

(21) Appl. No.: 13/973,935

(22) Filed: Aug. 22, 2013

(65) Prior Publication Data
US 2013/0340002 A1 Dec. 19, 2013

Related U.S. Application Data

(63) Continuation of application No. 13/112,731, filed on May 20, 2011, now Pat. No. 8,544,054.

(51) Int. Cl.

| | | |
|---|---|---|
| *G06F 3/00* | (2006.01) | |
| *G06F 13/00* | (2006.01) | |
| *H04N 5/445* | (2011.01) | |
| *H04N 7/173* | (2011.01) | |
| *H04N 7/16* | (2011.01) | |
| *H04N 21/422* | (2011.01) | |
| *H04H 20/28* | (2008.01) | |
| *H04N 5/44* | (2011.01) | |
| *H04H 20/76* | (2008.01) | |
| *H04N 21/482* | (2011.01) | |
| *H04N 21/4782* | (2011.01) | |
| *H04N 21/462* | (2011.01) | |
| *H04N 21/478* | (2011.01) | |
| *H04N 7/10* | (2006.01) | |

(Continued)

(52) U.S. Cl.
CPC ......... *H04N 21/42221* (2013.01); *H04H 20/28* (2013.01); *H04H 20/76* (2013.01); *H04N 5/4401* (2013.01); *H04N 5/44543* (2013.01); *H04N 7/10* (2013.01); *H04N 7/173* (2013.01); *H04N 7/17309* (2013.01); *H04N 7/17318* (2013.01); *H04N 21/4122* (2013.01); *H04N 21/4367* (2013.01); *H04N 21/43615* (2013.01); *H04N 21/4622* (2013.01); *H04N 21/478* (2013.01); *H04N 21/4782* (2013.01); *H04N 21/482* (2013.01)

(58) Field of Classification Search
None
See application file for complete search history.

(56) References Cited

U.S. PATENT DOCUMENTS 6,046,760 A * 4/2000 Jun .................. H04N 21/40
348/E5.002
7,689,169 B2 * 3/2010 Lee et al. .................. 455/41.2

(Continued)

*Primary Examiner* — Jonathan V Lewis
(74) *Attorney, Agent, or Firm* — Seed Intellectual Property Law Group PLLC

(57) ABSTRACT

A system and method for optimizing pairing between a remote device and a plurality of devices including establishing a list of pairing-capable devices, the list comprising a portion of the plurality of devices, measuring a plurality of link qualities between the remote device and the pairing-capable devices, comparing, with a processor, the plurality of link qualities with one another and determining a highest link quality, selecting, by a computing device, an available pairing-capable device having the highest link quality, pairing with the selected device, and controlling a presentation device, the controlling including checking if the selected device is the associated device and where the selected device is not the associated device, relaying commands via the network to the associated device.

14 Claims, 3 Drawing Sheets

(51) Int. Cl.
*H04N 21/436* (2011.01)
*H04N 21/41* (2011.01)
*H04N 21/4367* (2011.01)

(56) References Cited

U.S. PATENT DOCUMENTS

| | | | |
|---|---|---|---|
| 8,316,400 B1 | 11/2012 | Kravets | |
| 8,564,727 B2 * | 10/2013 | Okuda | G08C 17/02 348/725 |
| 8,611,538 B2 * | 12/2013 | Morioka | H04L 9/0827 380/270 |
| 8,947,199 B2 * | 2/2015 | Lucaci | H04L 12/282 340/12.22 |
| 2002/0094778 A1 * | 7/2002 | Cannon et al. | 455/41 |
| 2002/0194596 A1 * | 12/2002 | Srivastava | H04N 21/478 725/37 |
| 2003/0028886 A1 * | 2/2003 | Wang et al. | 725/78 |
| 2004/0148632 A1 * | 7/2004 | Park | H04N 5/44582 725/81 |
| 2006/0053444 A1 | 3/2006 | Rudolph et al. | |
| 2007/0014420 A1 | 1/2007 | Brown | |
| 2007/0061848 A1 | 3/2007 | Kang | |
| 2007/0080934 A1 | 4/2007 | Chen et al. | |
| 2007/0256126 A1 | 11/2007 | Erickson et al. | |
| 2008/0101227 A1 | 5/2008 | Fujita et al. | |
| 2008/0146151 A1 * | 6/2008 | Lyu et al. | 455/41.2 |
| 2008/0157993 A1 | 7/2008 | Du Breuil et al. | |
| 2009/0049493 A1 * | 2/2009 | White | H04N 7/163 725/110 |
| 2009/0146779 A1 | 6/2009 | Kumar et al. | |
| 2010/0052853 A1 | 3/2010 | Hilton | |
| 2010/0052870 A1 * | 3/2010 | King | 340/286.02 |
| 2010/0103316 A1 | 4/2010 | Colsey et al. | |
| 2010/0261469 A1 * | 10/2010 | Ribeiro et al. | 455/423 |
| 2011/0047581 A1 | 2/2011 | Caspi et al. | |
| 2011/0273625 A1 | 11/2011 | McMahon et al. | |
| 2011/0302619 A1 * | 12/2011 | Hale et al. | 725/110 |
| 2011/0307932 A1 | 12/2011 | Fan et al. | |
| 2012/0096503 A1 * | 4/2012 | Slothouber et al. | 725/110 |
| 2012/0151525 A1 * | 6/2012 | Demchenko | H04N 21/482 725/39 |
| 2012/0238288 A1 | 9/2012 | Donaldson | |
| 2012/0260282 A1 * | 10/2012 | Dasher et al. | 725/37 |

\* cited by examiner

300

```
┌─────────────────────────────────────────────────────────┐
│ RECEIVING A SIGNAL FROM A REMOTE CONTROL PAIRED WITH THE FIRST │
│ SET-TOP-BOX                                             │
│     - CARRYING INSTRUCTIONS FOR CONTROLLING AN          │──302
│       AUDIOVISUAL DISPLAY                               │
│     - IDENTIFYING INFORMATION ABOUT A SECOND OF THE PLURALITY │
│       OF SET-TOP-BOXES                                  │
└─────────────────────────────────────────────────────────┘
                              │
                              ▼
┌─────────────────────────────────────────────────────────┐
│ SENDING THE INSTRUCTIONS VIA A NETWORK TO THE SECOND    │──304
│ SET-TOP-BOX ASSOCIATED WITH THE REMOTE CONTROL          │
└─────────────────────────────────────────────────────────┘
```

```
┌─────────────────────────────────────────────────────────┐
│ RECEIVING INSTRUCTIONS FOR CONTROLLING AN AUDIOVISUAL DISPLAY │
│ VIA A NETWORK INDIRECTLY FROM AN ASSOCIATED REMOTE CONTROL │
│     - REMOTE CONTROL PAIRED WITH A SET-TOP-BOX ON THE NETWORK │──402
│     - REMOTE CONTROL ASSOCIATED WITH SET-TOP-BOX RECEIVING │
│       INSTRUCTIONS                                      │
└─────────────────────────────────────────────────────────┘
                              │
                              ▼
┌─────────────────────────────────────────────────────────┐
│ IMPLEMENTING THE INSTRUCTIONS TO CONTROL THE AUDIOVISUAL │──404
│                        DISPLAY                          │
└─────────────────────────────────────────────────────────┘
```

FIG.4

SYSTEM AND METHOD FOR REMOTE DEVICE PAIRING

FIELD OF THE INVENTION

The present application relates generally to optimizing communication for remote devices. More particularly, the present application relates to optimizing wireless communication between remote devices and controlled devices based on link quality. Still more particularly, the present application relates to optimizing radio frequency communication between remote controls and associated audiovisual equipment.

SUMMARY

In one embodiment, a method for optimizing pairing between a remote device and a plurality of devices may include establishing a list of pairing capable devices where the list comprises a portion of the plurality of devices. The method may also include measuring a plurality of link qualities between the remote device and the pairing capable devices and comparing, with a processor, the plurality of link qualities with one another to determine a highest link quality. The method may also include selecting, with a processor, the pairing capable device having the highest link quality and offering to pair with the selected device.

In another embodiment, a computer readable storage medium may include instructions stored thereon for optimizing pairing between a remote device and a plurality of devices. The instructions may include the steps of establishing a list of pairing capable devices where the list comprises a portion of the plurality of devices. The instructions may also include measuring a plurality of link qualities between the remote device and the pairing capable devices and comparing, with a processor, the plurality of link qualities with one another to determining a highest link quality. The instructions may also include selecting, with a processor, the pairing capable device having the highest link quality and offering to pair with the selected device.

In yet another embodiment, a system for optimizing remote device pairing may include a remote device and a plurality of devices having a configuration mode for communicating pairing capabilities. The system may also include an optimization module having a computer readable storage medium with instructions stored thereon and a processor for executing the instructions. The instructions may include steps for optimizing pairing between the remote device and the plurality of devices.

In yet another embodiment, a method for facilitating indirect communication with one of a plurality of set-top-boxes may include receiving, at a first of the plurality of set-top-boxes, a signal carrying instructions for controlling an audiovisual display and identifying information about a second of the plurality of set-top-boxes. The method may also include sending the instructions, at the first set-top-box, via a network to the second set-top-box.

In still another embodiment, a method for indirect control of a set-top-box may include receiving at a first of a plurality of set-top-boxes, instructions for controlling an audiovisual display. The instructions may be received via a network indirectly from an associated remote control in communication with a second of a plurality of set-top-boxes. The method may also include implementing the instructions to control the audiovisual display.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIG. 3 is a flow chart illustrating a method for facilitating indirect communication with one of the plurality of devices of FIG. 1.

FIG. 4 is a flow chart illustrating a method for indirect control of one of the plurality of devices of FIG. 1.

DETAILED DESCRIPTION OF THE EMBODIMENTS

Figure 1:
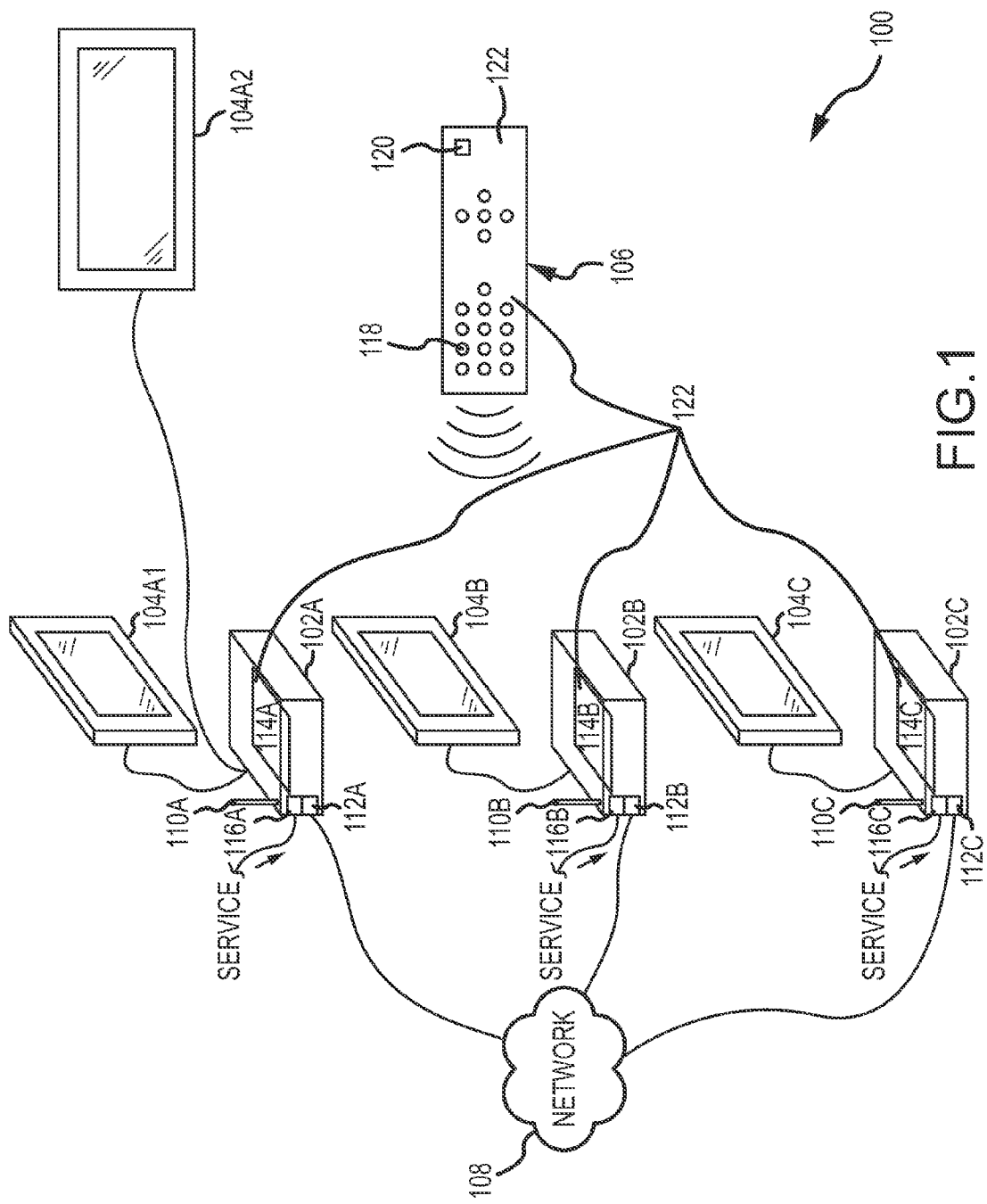
FIG. 1 is a diagram illustrating a remote device and a system of audiovisual displays supported by a plurality of devices connected to a network, according to some embodiments.

The description that follows includes sample systems and methods that embody various elements of the present disclosure. However, it should be understood that the described disclosure may be practiced in a variety of forms in addition to those described herein.

Remote communication has been available for control of audiovisual equipment or other electronic devices for quite some time. It is common place for households across the world to include one or, more commonly, several remote controls for controlling the several pieces of audio, visual, and/or audiovisual equipment present in the household.

Remote controls commonly communicate with an infrared signal that is based on electromagnetic radiation having a wavelength longer than that of visible light. The power and wavelengths used in infrared signals for household remote controls causes the signals to be useful over relatively short generally unobstructed communication paths. In some cases, the signal may be capable of reflecting off of one or more surfaces and still reach the intended receiving device. However, communication through or around objects is often not possible with household infrared remote controls.

Radio Frequency remote controls have been developed and are becoming more popular for use with audio, visual, and/or audiovisual equipment. Systems using radio frequency often include a radio frequency antenna on a device and a remote control configured to communicate with the device via the antenna. The ability of radio frequency remote controls to communicate through and around objects has made them useful in households or with systems where, for example, a device is being controlled from a more distant location such as another room, another floor, or otherwise more distant from the device than a location suitable for infrared communication. For example, some television systems may include a single controller for controlling more than one television. This may include a first television connected to a set-top-box and a second television connected to the same set-top-box. Each television may be located in separate rooms, for example, and a single remote control configured to communicate with the set-top-box may be used from each of the rooms. The radio frequency remote control may allow for communication with the set-top-box from either room and may thus allow for controlling the audiovisual content being transmitted to the respective television. In other instances, the set-top-box may be placed out of sight in a closet or equipment cabinet thus preventing infrared communication, but still allowing radio frequency communication.

While radio frequency communication may be advantageous over infrared communication, radio frequency communication may suffer from interference from several sources and may be relatively unpredictable, from a user's standpoint, when considering the signal quality between the remote control and the associated device. Moreover, in addition to radio frequency remotes, other developments in television program viewing have led to connecting several set-top-boxes together via a network. In some cases, this may be done to allow for sharing the recorded content on one set-top-box with another set-top-box and, thus, maximizing the storage space available to store programs or other audiovisual content.

The present application relates generally to a system configured to optimize communication between the system and one or more remote devices. The embodiments disclosed herein may leverage the advantages of radio frequency remotes over infrared remotes and may further leverage the utility of networked set-top-boxes to reduce or minimize some of the communication drawbacks of radio frequency remotes.

In one embodiment, the system may include a radio frequency remote control and one or more set-top-boxes each connected to a common network. The radio frequency remote control may be configured to selectively pair with one of the set-top-boxes based on link quality. Where the set-top-box selected is not directly connected to the television being viewed, the selected set-top-box may communicate via the network with the set-top-box connected to the television and thus control the audiovisual content presented to the user.

This system may allow for more efficient communication between the remote control and the network of set-top-boxes. While the logical communication path for controlling a set-top-box may appear to be to control the set-top-box that is directly connected to the television, many circumstances surrounding the use of radio frequency remote controls may cause that to not be the case. For example, where a set-top-box is positioned in a naturally insulating cabinet such as a metal cabinet, the set-top-box may not receive radio frequency transmissions as readily as it would in another location. In other examples, such as the example described above where one set-top-box is connected to two televisions, the indirect communication may be advantageous. For example, when a user is watching the television positioned in a room apart from the set-top-box, the user may be closer to an alternative set-top-box located in an adjacent room for example. In this case, the indirect communication through the set-top-box in the adjacent room and the network may be more efficient than direct communication with the set-top-box connected to the television being viewed.

Referring now to FIG. 1, in one embodiment, a system 100 may include a remote device 106 and a plurality of devices 102 connected to one another for communication with one another via a network 108. The plurality of devices 102 may each be configured for communication with the remote device 106 and, in some cases, may be configured for controlling an additional device 104 such as an audiovisual display, as shown. The system 100 may also include an optimization module 122 for optimizing the communication between the remote device 106 and the plurality of devices 102.

The plurality of devices 102 may include set-top-boxes and other audiovisual equipment, vehicles, machinery, or equipment, building controls, and other devices. Moreover, the plurality of devices 102 also need not be the same and a variety of devices 102 may be included in the plurality of devices 102. The plurality of devices 102 may include devices 102 capable of communicating over a network 108 and capable of being remotely controlled. Accordingly, the plurality of devices may each include a remote communication system 110, a network communication system 112, and a control system 114. The remote communication system 110 may be configured for receiving and/or transmitting communication between the device 102 and the remote device 106. The network communication system 112 may be configured for receiving and/or sending network communication between the device 102 and other network connected devices 102. The control system 114 may be connected to both of the remote communication system 110 and the network communication system 112 and may be configured to produce outgoing information, process incoming information and/or store information.

The remote communication system 110 may include a receiver for receiving and converting signals from the remote device 106. The receiver may be in electrical communication with an antenna or other signal collecting element and the antenna and receiver may receive a signal from the remote device 106, filter information from the signal, and pass the information on to a portion of the device 102. In some embodiments, the remote communication system 110 may also include a transmitter for producing and transmitting signals to the remote device 106. The transmitter may be in electrical communication with an antenna or other signal producing element and the antenna and transmitter may receive an instruction from a processor, for example, produce a signal carrying the instruction, and send the signal to the remote device 106. In still other embodiments, the remote communication system 110 may include a combined transmitter and receiver in the form of a transceiver or a transmitter-receiver. Depending on the arrangement of the system 100 and the particular embodiment of the method 200 being performed, some or all of the plurality of devices 102 may include remote communication systems 110 configured to receive information or they may include remote communication systems 110 configured to receive and transmit information.

The network communication system 112 may include a network cable port, jack, or other hardwire-type connection for placing the control system 114 in communication with the network 108 and controlling incoming and outgoing information. In other embodiments, the network communication system 112 may include a wireless network connection for accessing a wireless network and transmitting and receiving outgoing and incoming information respectively.

The control system 114 may be configured for producing outgoing information, processing incoming information, and storing information. The control system 114 may thus be in the form of a computer-type device having one or more processing units, one or more inputs, one or more outputs, and one or more computer readable storage media (which may take the form of, but is not limited to: a magnetic storage medium; optical storage medium; magneto-optical storage medium; read only memory; random access memory; erasable programmable memory; flash memory; non-transitory storage media; and so on).

In the embodiment shown in FIG. 1, the plurality of devices 102 includes a plurality of set-top-boxes. The set-top-boxes may each include a remote communication system 110 including a receiver for receiving signals from a remote control, for example. The receiver may be a radio frequency receiver and may include an antenna. The antenna may be positioned on the back side of the set-top-box, as shown, or another location may be provided. Depending on the type of method being implemented, as will be described in more detail below, the remote communication system 110 may also include a transmitter for transmitting signals to a remote control and/or a transceiver may be provided. The set-top-box may include a network port for connection to a home network for example and the set-top-box may include a control system 114 including a processor and a data storage system.

In addition to the remote and network communication systems 110, 112 and the control system 114, the set-top-boxes may be further configured to receive incoming programming content including audiovisual streams, associated meta data, and other audiovisual content from a television service provider, for example. As such, the set-top-box may also include a programming content system 116 configured to receive incoming programming content and send the programming content to a display device 104 for viewing. The control system 114 may support the programming content system 116 and may receive programming content from the programming content system 116 and may process and/or store the programming content. The control system 114 may also send the programming content to a television or other audiovisual display device via the programming content system 116. The network communication system 110 for a set-top-box may also allow the plurality of set-top-boxes to share content stored in their respective computer readable storage mediums.

The network 108 may be a wired network or a wireless network and may support relatively high speed communication between the several devices 102 on the network 108. In one embodiment, the network 108 may be a local area network such as a home or office network. In other embodiments, the network 108 may be wide area network such as the Internet, for example, or a combination of local and wide area networks may be provided. Other network types for facilitating communication between a plurality of devices 102 may be provided.

The remote device 106 may be configured to wirelessly communicate with the remote communication system 110 of one or several of the plurality of devices 102. As such, the remote device 106 may include a receiver and antenna and a transmitter and antenna, similar to that described with respect to the plurality of devices 102 described above. Alternatively, a transceiver or transmitter-receiver may be provided.

The remote device 106 may also be configured to control one or more of the plurality of devices 102. The remote device 106 may thus include a computer readable storage medium for storing a plurality of sets of instructions. The remote device 106 may include a user interface 118 allowing for user interaction with the remote device 106 to actuate transmission of particular sets of instructions. The user interface 118 may include a plurality of buttons, switches, keys, joysticks, mice, and other user interfaces. In some embodiments, the user interface 118 may include a particular pairing actuation feature 120 for initiating the pairing process.

The remote device 106 may be configured for pairing with one or more of the plurality of devices 102 and may thus have a processor for facilitating the communication and analyzing the resulting information received from the plurality of devices 102, for example.

In one embodiment, as shown, the remote device 106 may be in the form of a remote control for controlling a set-top-box, for example. The remote control may include a user interface 118 adapted for changing channels, accessing programs guides or other menus, recording, fast forwarding, rewinding, and the like. In some embodiments, the pairing actuation feature 120 may include a portion of the user interface 118 in the form of a button for initiating the pairing method described.

In other embodiments, the remote device 106 may be a telephone modem, for example, having a radio signal receiver and/or transmitter device. This may allow a system such as the one shown in FIG. 1, for example, to communicate via a telephone line with a service provider, for example, or other entities or devices outside the system 100. This may allow for ordering of pay-per-view movies, for example, without having the set-top-boxes wired to a phone jack for example. Other devices may also be used for the remote device 106.

The optimization module 122 may be a stand alone device or it may include parts of the remove device 106 and parts of some or all of the plurality of devices 102. The optimization module 122 may include hardware, software, or a combination of hardware and software and may include computer implemented instructions for performing the method described. For example, the instructions may be stored in one or more computer readable storage mediums and one or more processors may access the instructions and perform some or all of the instructions. In some embodiments, the optimization module 122 may be resident on the remote control 106 and be incorporated in the several parts thereof. In other embodiments, the optimization module 122 may be resident on one of the plurality of devices 102 or on each of the plurality of devices 102. In still other embodiments, portions of the optimization module 122 may be resident on the remote control 106 and other portions may be resident on one or each of the plurality of devices 102. Several arrangements of the several parts of the optimization module 122 may be provided and may be selected based on logical requirements, cost, efficiency, and other factors.

Figure 2:
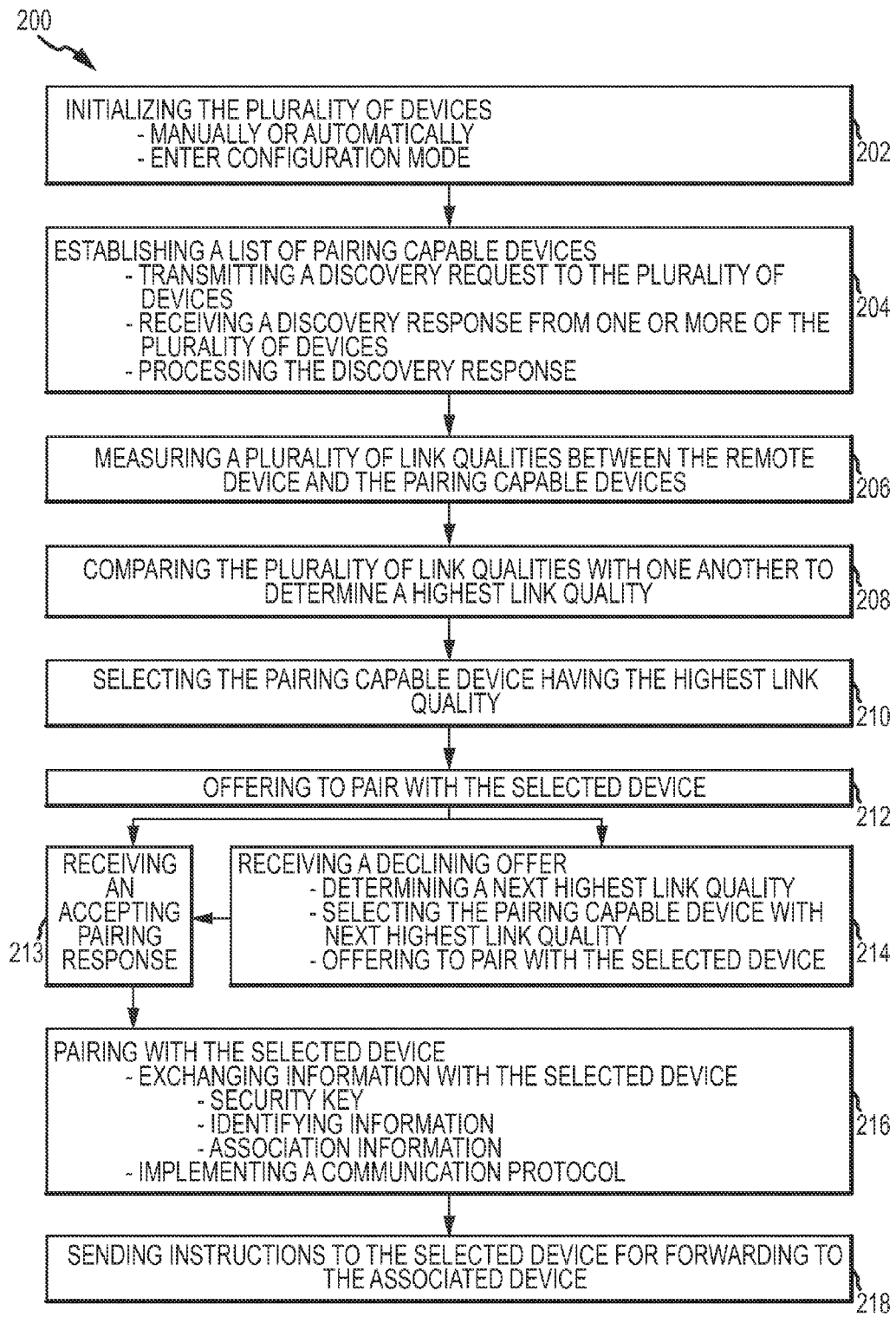
FIG. 2 is a flow chart illustrating a method for optimizing pairing between the remote device and the plurality of devices of FIG. 1.

Having described a system 100 upon which the current methods may be performed, reference is now made to FIG. 2, which illustrates a method (200) for optimizing remote device pairing. The method (200) may be performed by the optimization module and may generally include initialization (202), gathering pairing availability information regarding a plurality of devices (204), measuring link quality between a remote device and the available devices (206), comparing the link qualities (208), selecting the highest link quality (210), and pairing the remote device with the device having the highest link quality (212), (213), (214). It is to be understood that the methods are not limited to use with television systems, set-top-boxes systems, or even audiovisual equipment generally. Rather, the methods herein may be used in an array of contexts. However, for purposes of context and examples, the method described herein (200) may be described with respect to the system embodiment of FIG. 1 including a plurality of set-top-boxes in a household, each connected to a common network, and a remote control for controlling the set-top-boxes. Accordingly, the plurality of devices 102 may be referred to going forward as a plurality of set-top-boxes 102 and the remote device 106 may be referred to going forward as a remote control 106.

Within that context, an "associated" set-top-box 102 may include the set-top-box 102 conventionally associated with the remote control 106 for direct control by the remote control 106. For example, the associated set-top-box 102 may commonly be the set-top-box 102 in the same room as the user is viewing. Accordingly, where the user is using a remote control 106 in a room with set-top-box 102C and viewing television 104C, set-top-box 102C may be the associated set top box with respect to the remote control 106. In some circumstances, the associated set-top-box 102 may be in a nearby or adjacent room where, for example, the user is in a room with television 104A2. Since set-top-box 102A is directly connected to television 104A2, set-top-box 102A will be termed the associated set-top-box 102 when television 104A2, or 104A1 for that matter, is being viewed.

It is noted that the remote device 106 may be described as though only one remote device 106 is provided. However, the system 100 may include one or more remote devices 106 and reference to a single remote device 106 within the system 100 may merely help to clarify that the remote device 106 being discussed is the one the user is interacting with.

Initialization (202) may be triggered in one of several ways and may be user actuated or automatic. In one embodiment, the remote control 106 may include a pairing button allowing a user to press the button to trigger initialization. In this embodiment, the user may control when the remote control 106 is initially paired and how often the remote control 106 is de-paired and re-paired. In other embodiments, initialization (202) may be triggered automatically and may be controlled by a timer for periodically conducting pairing. In another embodiment, the remote 106 may expect acknowledgments for its commands and initialization may be automatically triggered if the remote does not receive sufficient acknowledgment of commands. In still other automatic embodiments, initialization (202) may be substantially continuous during use and may, for example, be triggered at each button push on the remote control 106 or every fifth button push or other increment of button pushing. Initialization (202) may be triggered in other suitable manners and a suitable initialization trigger may be selected to accommodate how often the signal quality between the remote device 106 and the plurality of devices 102 is changing. That is, for example, where the spatial relationships between the remote device 106 and the plurality of devices 102 changes frequently or rapidly, or where interference is varying, a more frequent initialization (202) and resulting pairing process (200) may be used. The suitable initialization trigger may also be selected based on the use of battery life or other power source, for example. Other factors may also be considered when selecting an initialization trigger.

Once triggered, the initialization process (202) may include configuring the plurality of devices 102 for pairing communication. That is, in common functional mode, set-top-boxes 102 for example, may not allow communication with any or all remote controls 106. Rather, the set-top-box 102 may be paired with a particular remote control 106 or series of remote controls 106 and may not recognize or listen to communications transmitted by non-paired remote controls 106. This may help to prevent inadvertent communication with a next-door-neighbor's set-top-box 102, for example. As such, to provide for as many options as possible when evaluating which set-top-box 102 to pair with, the initialization step (202) may configure some or all of the plurality of devices 102 for pairing.

Configuring for pairing may involve reducing security measures relating to incoming signals or tuning to a particular frequency to receive pairing communications. In some embodiments, while security measures may be reduced, they may still be sufficient to prevent interference from equipment or devices not associated with the system 100. That is, for example, an operational security level may be provided such that when a remote control 106 is paired with a device 102, a relatively high level of security is provided. However, in configuration mode, for example, a lesser level of security may be provided where communications from all of the remote controls 106 associated with the system 100 may be recognized by the devices 102, but communications from other remote controls 106 outside the system 100 are not recognized. Other configuring approaches may be provided to allow all of the set-top-boxes 102 to receive pairing communications from the remote control 106, from each other, or from other devices. It is noted that upon initial set-up of a set-top-box 102, the set-top-box 102 may be in configuration mode and may not require an initialization step (202).

The configuration portion of the initialization (202) may be performed in one of several ways. For example, where the initialization trigger is associated with the remote control 106 (e.g., actuated by a button push), the configuration may occur by transmitting a signal to the set-top-box 102 paired with the remote control 106 indicating that a pairing process has been or is being initialized. The set-top-box 102 may receive the signal and the processor may prepare and send instructions to the other set-top-boxes 102 on the network 108 to configure for pairing. The other set-top-boxes 102 may receive the instructions and process the message. The processor on these set-top-boxes 102 may then proceed to configure the respective set-top-boxes 102 for pairing. In another example, where the initialization trigger is associated with a set-top-box 102 for example, the initial transmission from the remote control 106 to the set-top-box may be omitted and the set-top-box 102 may send instructions to the other set-top-boxes 102 via the network 108 as above.

Having placed the plurality of devices 102 in configuration mode, the process of selecting a device 102 to pair with may begin. The method (200) may include establishing a list of pairing capable devices (204). A communication may be transmitted or sent by the optimization module 122 using the remote control 106, a set-top-box 102, or another device. The communication may be a discovery request. In one embodiment, the discovery request may include the remote control 106 sending a broadcast signal for receipt by all set-top-boxes 102 within range requesting information regarding whether the set-top-box 102 is capable of pairing. The discovery request may include model or other information about the remote control 106 that the set-top-box 102 may use to determine if pairing can occur. Information regarding the remote control 106 may also not be provided. In another embodiment, the discovery request may include the set-top-box 102 sending a communication across the network or otherwise to other set-top-boxes requesting information regarding whether each of the other set-top-boxes 102 is capable of pairing. The request may be made on behalf of a particular remote and model information may or may not be provided. In still other embodiments, a table of information may be stored in a computer readable storage medium that lists the one or more remotes 106 of a given system 100 and further lists the one or more set-top-boxes 102 capable of pairing with that remote 106. In this embodiment, the discovery request may be omitted and the table may be accessed to determine the list of pairing capable devices. The table may be updated periodically using discovery requests similar to those just described.

Where a discovery request is received, the set-top-boxes 102 in configuration mode may receive the communication and transmit or send a discovery response back to the optimization module indicating whether they are capable of pairing with the remote 106. In some embodiments, where a set-top-box 102 is not capable of pairing, the set-top-box 102 may not send a communication back to the source of the discovery request. For example, where a set-top-box 102 is not in configuration mode, the set-top-box 102 may not receive the discovery request and may not respond. This may occur where, for example, the set-top-box 102 is not on the network such as unconnected set-top-boxes 102, the set-top-box 102 does not support pairing, or the set-top-box 102 is outside the system. For the set-top-boxes 102 in configuration mode, other circumstances may lead to a negative discovery response. This may be a matter of lack of capacity to pair generally and in other embodiments this may be a matter of lack of capacity to pair with the particular make and/or model of remote control 106 or transmitter sending the signal. The set-top-box 102 may also include an identifier with the discovery response identifying the set-top-box 102 that is sending the response. Where the set-top-box 102 is capable of pairing with the remote control 106, the set-top-box 102 may send a positive discovery response to the optimization module 122.

The optimization module 122 may receive the discovery responses from one or more of the plurality of set-top-boxes 102 and may analyze the results and temporarily store, mark, highlight, or otherwise delineate the set-top-boxes 102 that are capable of pairing to form a list of pairing capable devices (204).

In addition to collecting pairing information through discovery requests and responses, the optimization module 122 may also capture the link quality (206) present between the remote control 106 and each of the plurality of set-top-boxes 102. The link quality may be defined in several ways. Where radio frequency signals are used, the link quality may be defined by the bit error rate or other measurable value of link quality. Other measurable values and combinations thereof may also be used. Where other types of signals are used, other link quality values may be selected.

The link quality may be captured, for example, when the remote 106 sends a discovery request or when the remote 106 receives a discovery response or the optimization module 122 may capture the link quality apart from these signal transmissions. That is, a dedicated link quality transmission may be actuated between the remote 106 and the plurality of set-top-boxes 102 particularly for monitoring and measuring the link quality. It is noted that the link quality recognized between the remote 106 and a set-top-box 102 may vary depending on which vantage point is used to analyze the signal. For example, localized interference and other factors may cause a remote 106 to recognize a particular link quality while the set-top-box 102 in communication with the remote 106 may recognize another link quality. In some embodiments, the average of these two link qualities may be produced and used as the link quality or the higher or lower value of link quality may be selected and used as the link quality.

With information regarding which set-top-boxes 102 are capable of pairing, the link quality between the remote control 106 and at least the pairing-capable set-top-boxes 102, and identifiers for the pairing-capable set-top-boxes, the processor of the optimization module 122 may compare the link qualities between the remote control 106 and the one or more set-top-boxes 102 that are capable of pairing (208). The processor may select the set-top-box 102 with the highest link quality (210) and mark, highlight, or store the associated identifier.

The optimization module 122 may send a pair request to the identified set-top-box 102. For example, in one embodiment, the optimization module 122 may cause the remote control 106 to send another broadcast signal carrying the identifier of the set-top-box 102 with the highest link quality and a request to pair (212) with the identified set-top-box 102. Several set-top-boxes 102 still in configuration mode may receive the signal and may read the identifier to determine where the signal is directed and compare the identifier to a stored identifier. If the communicated identifier matches the set-top-box identifier, the set-top-box 102 may further process the signal, but if a match is not found, the set-top-box may not further process the signal. In other embodiments, the optimization module 122 may use a set-top-box 102 to send the pair request. This may include recognizing the identified set-top-box 102 and sending the pair request directly to the identified set-top-box 102 or, as above, the pair request may be sent to several set-top-boxes 102 with the identifier and each set-top-box 102 may determine whether to further process the signal.

In processing the pairing request, the identified set-top-box 102 may respond to the optimization module 122 with a pairing accepted (213) or pairing declined (214) message. Where pairing is declined (214), the optimization module 122 may return to the results of the set-top-boxes 102 that are capable of pairing and select the set-top-box 102 having the next highest link quality. The optimization module may then send a pair request to this second choice set-top-box 102. The optimization module may continue to send pair requests until a pairing accepted response (213) is received.

If a pairing accepted response is received, additional communication between the remote control 106 and the selected set-top-box 102 may be conducted (216). For example, security key information may be exchanged such that the remote control 106 and the set-top-box 102 may communicate outside of configuration mode, under a higher level of security consistent with a communication protocol, for example. Once exchanged, the security key information may allow the remote control 106 and the set-top-box 102 to more fully communicate with additional information consistent with the protocol that may not be permitted during the pairing process. For example, the remote control 106 and the set-top-box 102 may exchange identifying information and association information. That is, the remote control 106 may provide identifying information such that the set-top-box 102 can identify further communications as being from the newly paired remote 106. The association information may include, for example, associated set-top-box 102 information such that the newly paired set-top-box 102 may know for which set-top-box 102 a particular instruction from the newly paired remote control 106 was intended.

In addition to further communication between the newly paired remote 106 and set-top-box 102, an additional closure step may be provided to take the remaining set-top-boxes 102 out of configuration mode. For example, the optimization module 122 may cause the newly paired remote control 106 to send a signal to the newly paired set-top-box 102 causing it to send an instruction via the network 108 to close configuration mode. In other embodiments, the optimization module 122 may cause the newly paired set-top-box 102 to send the instruction without first getting a signal from the newly paired remote 106. In still other embodiments, the optimization module 122 may cause another remote or other set-top-box to close configuration mode.

The pairing optimization process may be performed as described and the remote control 106 may proceed to send signals as instructed by a user, for example, to the paired set-top-box 102. The process of using the newly paired remote 106 and set-top-box 102 may be described with respect to FIGS. 3 and 4. To assist in describing the method, and with reference to FIG. 1, the paired set-top-box 102 will be set-top-box 102C in FIG. 1 and the associated set-top-box 102 will be set-top-box 102A in FIG. 1. However, it is to be understood that any combination of set-top-boxes 102 may be used and may be determined by the method (200) described above.

With reference to FIG. 3, a method (300) of processing a signal from a paired remote 106 may be described. The paired set-top-box 102C may receive the signals from the remote control (302) and transmit the information (304) in those signals through the network 108 to the associated set-top-box 102A.

With reference to FIG. 4, a method (400) of processing information from a paired set-top-box 102C may be described. The associated set-top-box 102A may receive information from the paired set-top-box 102C (402) and process the information to perform the tasks instructed by the information (404).

In one embodiment of the methods shown in FIGS. 3 and 4, a user may depress a guide button and the remote control 106 may send a signal to the paired set-top-box 102C including instructions to display the program guide. The paired set-top-box 102C may capture the instruction carried by the signal and may recognize the signal as being from paired remote control 106 and further that the instruction is directed toward and intended to control a function of the associated set-top-box 102A. Accordingly, the paired set-top-box 102C may prepare and send a message with the instruction to the associated set-top-box 102A via the network 108. The associated set-top-box 102A may receive the message, process the message, and perform the instruction. Accordingly, the remote control 106 may indirectly control its associated set-top-box 102A via the newly paired set-top-box 102C and the network 108.

In the present disclosure, the methods disclosed may be implemented as sets of instructions or software readable by a device. Further, it is understood that the specific order or hierarchy of operations in the methods disclosed are examples of sample approaches. In other embodiments, the specific order or hierarchy of operations in the method can be rearranged while remaining within the disclosed subject matter. The accompanying method claims present elements of the various operations in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for facilitating indirect communication with one of a plurality of set-top-boxes in a network, comprising:
   transmitting, by a remote control, a request for information regarding whether each of the plurality of set-top-boxes is capable of pairing with the remote control;
   receiving from the remote control, by a first set-top box of the plurality of set-top boxes, the request;
   transmitting to the remote control, by the first set-top box, a first reply to the request, the first reply including information indicating that the first set-top box is capable of pairing with the remote control;
   in response to the remote control receiving the first reply to the request, transmitting, from the remote control, an instruction signal carrying instructions for controlling an audiovisual display, and information identifying a second set-top box of the plurality of set-top-boxes;
   receiving, by the first set-top-box, from the remote control, the instruction signal carrying instructions for controlling the audiovisual display, and the information identifying the second set-top box;
   relaying, by the first set-top box, the instructions for controlling the audiovisual display via the network from the first set-top box to the identified second set-top-box.

2. The method of claim 1, wherein the remote control is paired with the first set-top-box.

3. The method of claim 2, wherein the second set-top-box is associated with the remote control.

4. A method for indirect control of a set-top-box, comprising:
   transmitting, from a remote control, a request for information regarding whether each of the plurality of set-top-boxes is capable of pairing with the remote control;
   receiving, at a first of a plurality of set-top boxes, the request from the remote control;
   in response to receiving the request, transmitting by the first of the plurality of set-top boxes to the remote control information indicating that the first of the plurality of set-top boxes is capable of pairing with the remote control;
   transmitting, from the remote control, an instruction signal carrying instructions for controlling an audiovisual display associated with a second of the plurality of set-top boxes;
   receiving, at the first of the plurality of set top boxes, the instruction signal carrying instructions for controlling an audiovisual display associated with the second of the plurality of set-top boxes;
   transmitting, from the first of the plurality of set top boxes, across a network, to the second of the plurality of set-top boxes, the instructions for controlling the audiovisual display associated with the second of the plurality of set-top boxes;
   receiving, at the second of the plurality of set-top boxes, across the network, from the first of the plurality of set-top boxes, the instructions for controlling the audiovisual display associated with the second of the plurality of set-top boxes; and controlling the audiovisual display according to the instructions received, via the network, from the first of the plurality of set-top boxes.

5. The method of claim 4, wherein the remote control is paired with the second set-top-box and is associated with the first set-top-box.

6. The method of claim 4, further comprising measuring, by the remote control, a link quality of the first of the plurality of set-top boxes, as indicated by the first link quality indicator.

7. The method of claim 4, further comprising:
receiving, by the remote control, a second link quality indicator;
comparing, by the remote control, the second link quality indicator to the first link quality indicator; and
associating with the first of the plurality of set-top boxes in response to comparing the second link quality indicator to the first link quality indicator.

8. A method comprising:
connecting a plurality of set-top boxes into a network that permits them to communicate with each other;
transmitting, from a remote control outside the set-top box network, a request for information regarding whether each of the plurality of set-top boxes is capable of pairing with the remote control;
receiving the request from the remote control, by a first set-top box of the plurality of set-top boxes;
transmitting a first reply to the request from the first set-top box to the remote control, the first reply including information indicating that the first set-top box is capable of pairing with the remote control;
in response to the remote control receiving the first reply to the request, transmitting, by the remote control, an instruction signal carrying instructions for controlling an audiovisual display, and information identifying a second set-top-box of the plurality of set-top-boxes;
receiving, from the remote control, by the first set-top box the instruction signal carrying the instructions for controlling the audiovisual display, and the information identifying the second set-top-box;
relaying from the first set-top box the instructions for controlling the audiovisual display via the network from the first set-top box to the identified second set-top-box.

9. The method of claim 8, further comprising:
receiving from the remote control, by a third set-top box of the plurality of set-top boxes, the request;
transmitting to the remote control, by the third set-top box, a second reply to the request, the second reply including information indicating that the third set-top box is capable of pairing with the remote control;
transmitting from the remote control to the third set-top box a first request to pair with the remote control;
receiving by the remote control, a response to the first request to pair with the remote control from the third set-top box, the response to the first request to pair with the remote control information indicating that the third set-top box declines the first request pair with the remote control;
transmitting from the remote control to the second set-top box a second request to pair with the remote control; and
receiving by the remote control, a response to the second request to pair with the remote control from the second set-top box, the response to the second request to pair with the remote control information indicating that the second set-top box accepts the second request to pair with the remote control.

10. The method of claim 9, further comprising:
determining that the third set-top box has a highest link quality; and
determining that the second set-top box has a second highest link quality, the second highest link quality being less than the highest link quality.

11. The method of claim 1, further comprising:
receiving from the remote control, by a third set-top box of the plurality of set-top boxes, the request;
transmitting to the remote control, by the third set-top box, a second reply to the request, the second reply including information indicating that the third set-top box is capable of pairing with the remote control;
transmitting from the remote control to the third set-top box a first request to pair with the remote control;
receiving by the remote control, a response to the first request to pair with the remote control from the third set-top box, the response to the first request to pair with the remote control information indicating that the third set-top box declines the first request pair with the remote control;
transmitting from the remote control to the second set-top box a second request to pair with the remote control; and
receiving by the remote control, a response to the second request to pair with the remote control from the second set-top box, the response to the second request to pair with the remote control information indicating that the second set-top box accepts the second request to pair with the remote control.

12. The method of claim 11, further comprising:
determining that the third set-top box has a highest link quality; and
determining that the second set-top box has a second highest link quality, the second highest link quality being less than the highest link quality.

13. The method of claim 4, further comprising:
receiving from the remote control, by a third of the plurality of set-top boxes, the request;
in response to receiving the request, transmitting by the third of the plurality of set-top boxes to the remote control information indicating that the third of the plurality of set-top boxes is capable of pairing with the remote control;
transmitting from the remote control to the third of the plurality of set-top boxes a first request to pair with the remote control;
receiving by the remote control, a response to the first request to pair with the remote control from the third of the plurality of set-top boxes, the response to the first request to pair with the remote control information indicating that the third of the plurality of set-top boxes declines the first request pair with the remote control;
transmitting from the remote control to the second of the plurality of set-top boxes a second request to pair with the remote control; and
receiving by the remote control, a response to the second request to pair with the remote control from the second of the plurality of set-top boxes, the response to the second request to pair with the remote control information indicating that the second of the plurality of set-top boxes accepts the second request to pair with the remote control.

14. The method of claim 13, further comprising:
determining that the third of the plurality of set-top boxes has a highest link quality; and determining that the second of the plurality of set-top boxes has a second highest link quality, the second highest link quality being less than the highest link quality.

\* \* \* \* \*